US008566463B2

(12) United States Patent
Tsao

(10) Patent No.: US 8,566,463 B2
(45) Date of Patent: Oct. 22, 2013

(54) CONCURRENT WEB BASED MULTI-TASK SUPPORT FOR CONTROL MANAGEMENT SYSTEM

(75) Inventor: Sheng Tai (Ted) Tsao, San Jose, CA (US)

(73) Assignee: Sheng Tai Tsao, Fremont, CA (US)

(*) Notice: Subject to any disclaimer, the term of this patent is extended or adjusted under 35 U.S.C. 154(b) by 298 days.

(21) Appl. No.: 12/079,482

(22) Filed: Mar. 27, 2008

(65) Prior Publication Data

US 2008/0177821 A1    Jul. 24, 2008

Related U.S. Application Data

(62) Division of application No. 10/713,904, filed on Aug. 6, 2002, now Pat. No. 7,418,702.

(51) Int. Cl.
*G06F 15/16* (2006.01)
*G06F 15/177* (2006.01)
*G06F 15/173* (2006.01)

(52) U.S. Cl.
USPC ........... 709/229; 709/201; 709/217; 709/220; 709/223

(58) Field of Classification Search
USPC ................ 709/229, 201, 220, 223, 217
See application file for complete search history.

(56) References Cited

U.S. PATENT DOCUMENTS

| | | | | |
|---|---|---|---|---|
| 6,173,293 B1 * | 1/2001 | Thekkath et al. | ............. | 707/201 |
| 6,269,404 B1 * | 7/2001 | Hart et al. | ............. | 709/238 |
| 6,754,546 B1 * | 6/2004 | Hindus et al. | ............. | 700/94 |
| 6,801,949 B1 * | 10/2004 | Bruck et al. | ............. | 709/232 |
| 6,944,785 B2 * | 9/2005 | Gadir et al. | ............. | 714/4 |
| 7,031,314 B2 * | 4/2006 | Craig et al. | ............. | 370/392 |
| 7,181,523 B2 * | 2/2007 | Sim | ............. | 709/226 |
| 7,240,105 B2 * | 7/2007 | Satran et al. | ............. | 709/222 |
| 7,287,186 B2 * | 10/2007 | McCrory et al. | ............. | 714/13 |
| 7,379,988 B2 * | 5/2008 | Bish et al. | ............. | 709/223 |
| 7,409,396 B2 * | 8/2008 | Pitts | ............. | 707/10 |
| 7,415,582 B2 * | 8/2008 | Miki et al. | ............. | 711/154 |
| 7,953,866 B2 * | 5/2011 | Walden et al. | ............. | 709/228 |
| 8,161,167 B2 * | 4/2012 | Bagepalli et al. | ............. | 709/227 |

* cited by examiner

*Primary Examiner* — Emmanuel L Moise
*Assistant Examiner* — Farzana Huq

(57) ABSTRACT

To improve efficiency of accessing and managing the central controlled distributed scalable virtual machine ("CCDSVM") of the present invention, the hundreds and thousands of systems in the CCDSVM can be organized into multiple groups (service pools) with a multi-layered hierarchy. The CCDSVM includes at least a control system to control and organize a management pool that comprises a plurality of middle level control systems, and each middle control system can control a service pool that comprises a plurality of servers (computing devices). In addition, different privileged users are permitted to log into each control system at different levels for further accessing the permitted servers in each pool. Specially, the present invention including a method of web based multi-tasking support to enhance the web based manageability and operations of the multi-layered CCDSVM.

22 Claims, 7 Drawing Sheets

Console support in CCDSVM environment

Data traveling between web-console and console supporting software a) Data Path 1:

Referred as sending data from web-console (9 of Fig. 2) to console support software (6 of Fig. 2) or referred as console supporting software (6 of Fig. 2) get data from web-console (9 of Fig. 2).

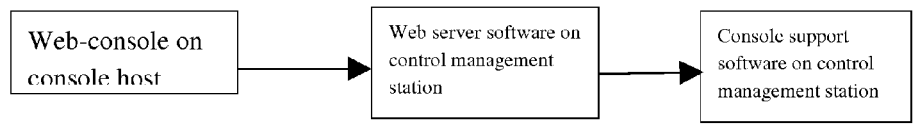

b) Data Path 2: (reverse path)

Referred as sending data from console supporting software (6 of Fig. 2) to web-console (9 of Fig. 2) or referred as web-console (9 of Fig. 2) gets data from console supporting software (6 of Fig. 2)

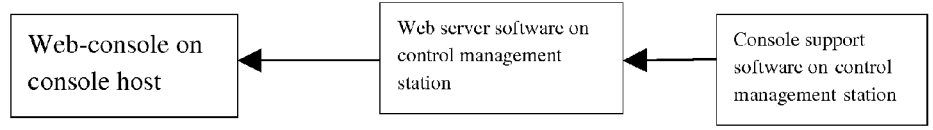

Fig. 3

Basic Task & Operation Processing Flow Chart in a CCDSVM environment.

The abstraction of data structure for multiple simultaneous concurrent tasks and operations support in CCDSVM environment.

The typical hardware components of a computer system 200 such as for control management station, system units, and console host:

CONCURRENT WEB BASED MULTI-TASK SUPPORT FOR CONTROL MANAGEMENT SYSTEM

CROSS-REFERENCES RELATED TO APPLICATION(S)

This is a divisional application of (a) U.S. patent application Ser. No. 10/713,904 filed on Aug. 6, 2002 that is converted from U.S. Provisional Application 60/401,238 and now is a U.S. Pat. No. 7,418,702.

FIELD OF THE INVENTION

The present invention generally relates to support web based multitasking for a single computing device or a plurality of computing devices of a web based central controlled distributed scalable virtual machine system ("CCDSVM"). with respect to a web based computer user work environment.

BACKGROUND OF THE INVENTION

A typical computer system provides a computer user work environment to end users, wherein the computer user work environment runs on top of a generic computer operating system. With this work environment, an end user can login to the computer system and. setup various computer resource access controls based on his or her permitted role. Therefore, the end user, for example, can configure computer resources such as disks, networks, file folder/directory systems, and others. Also, various computer tasks & operations can be executed by the computer application; and the computer operating system of a computer system provides the results of tasks to the end user. Specially, with a generic computer operating system, this computer user work environment allows a plurality of concurrent users each to run multiple concurrent tasks or operations simultaneously.

The computer user work environment has evolved from paper tape & punch card environment, command line environment on a native system to window & mouse click environment on a native system in the past. This invention provides users a web-based computer user work (operating) environment on top of generic operating system for a single or multiple computers, and allows each of the users to access one or multiple computing devices through a conventional web-browser.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

In the drawings:

FIG. 3 illustrates an example of basic data flow between a web-console on a console host and the console supporting software in a control management environment.

BRIEF DESCRIPTION OF THIS INVENTION

The traditional web server or other server may support a user from a web browser on a computing device somewhere on the network to perform tasks of accessing the server, that the task could get quick response and could be finished in a short period of time, fore example, checking a web server's status or getting the server's other information, et cetera. However, it may not support well for multiple simultaneous concurrent tasks or operations from the same web-browser, especially when these tasks are time consuming to finish.

Figure 1:
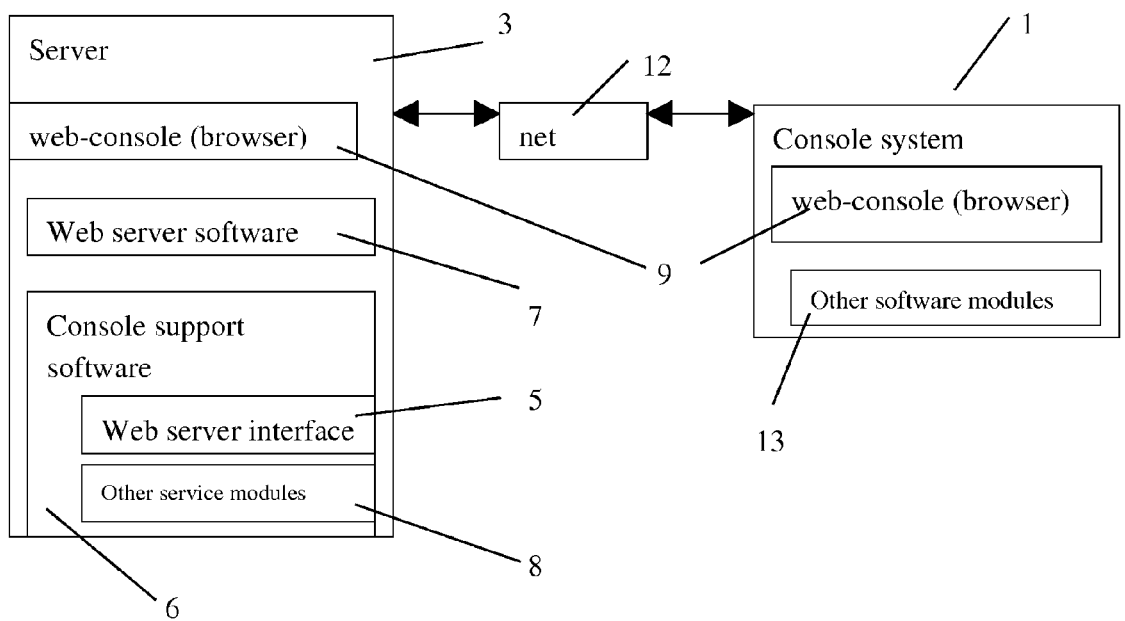
FIG. 1 illustrates an example of a simplified multi-tasks support on Web-console in a simple environment.

For example, creating a 60GB file system on the server, or configuring a raid controller on that server illustrated in FIG. 1 is such a time task. Because these tasks often take a large amount of time to be finished, and such tasks will experience hanging and blocked in the web-console (web browser) on a console host such as illustrated in FIG. 1, as a result, no other tasks could be performed in parallel from the same web-console at the same time. In addition, traditional console supporting software does not work for a more complicated environment such as the CCDSVM environment illustrated in FIG. 2.

Figure 2:
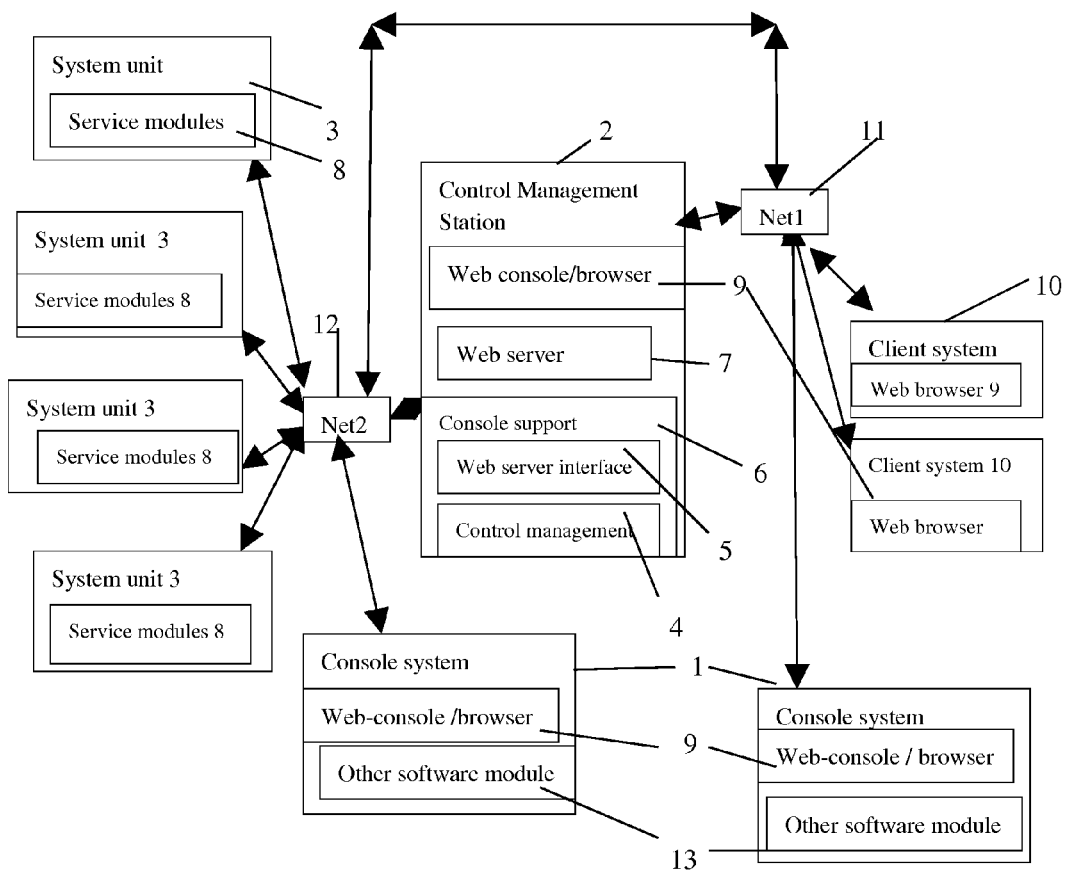
FIG. 2 illustrates an example of a simplified multi-tasks support on Web-console in a CCDSVM environment.

To solve these problems and effectively to support multiple simultaneous concurrent tasks in a web-console for both the simple computing environment as illustrated in FIG. 1 and the CCDSVM environment, the console supporting software illustrated in FIG. 1 needs to include additional control management software modules illustrated in FIG. 2 and others. As illustrated in FIG. 2, the control management software module shall communicate and control all system units 3 and each of the system units 3 needs service software modules to communicate with control management software 4 of console support software 6.

Figure 5:
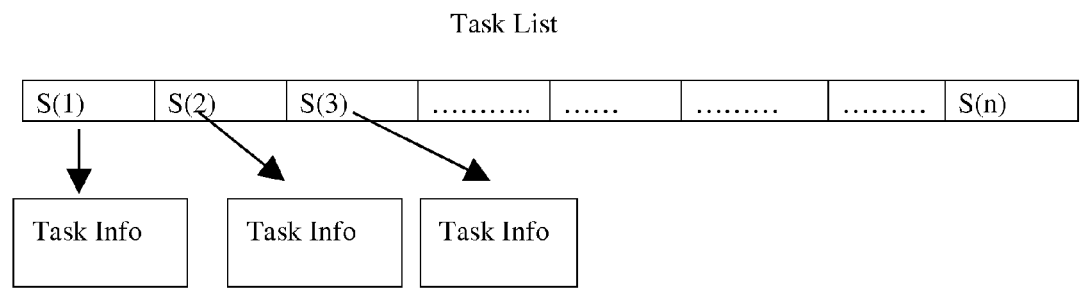
FIG. 5 illustrates a user space task list, which represents an abstraction of data structure for controlling multiple simultaneous concurrent tasks and operations in the CCDSVM environment.

In addition, a user space task list illustrated in FIG. 5 could be used together with conventional or non-conventional locks to support all multiple simultaneous concurrent tasks and operations. With this invention, the multi-tasks support on the web-console in a simple environment shown in FIG. 1 has been viewed as a special case of such support in a CCDSVM environment shown in FIG. 2. The CCDSVM degenerates into the simple server environment if there is no multiple system units 3 that is illustrated in FIG. 2.

These and other features, aspects and advantages of the present invention will become understood with reference to the following description, appended claims and accompanying figures set forth below.

DETAILED DESCRIPTION OF THE INVENTION

The CCDSVM, typically in one embodiment illustrated in FIG. 2, is configured to provide a control management station ("control system") to control a group of computing systems and provide distributed services to at least one client system across Intranet, Internet as well as a LAN environment. The software components of the CCDSVM form a virtual operating environment.

When a server provides software support for allowing a web-browser on a computing system (device) such as a desktop, laptop, server, PDA, or cell phone to access and manage the server, this web-browser is often referred as a web-console. With the CCDSVM, a permitted user from the web-console could be able to access and operate the entire CCDSVM.

To simplify the discussion, the term of thread and process are roughly used without differentiation between them in this invention regardless of the very restricted definition of the thread and process in computer science field. Here both thread and process are basically referred as a sequence of instructions based on a piece of program code that starts to be executed by a computer system step by step to carry out a computer task.

Lock is a mechanism that allows a thread to look a computer resource for its own use and prevents other threads from accessing to the same computer resource at the same time. There is conventional lock which can be acquired and released by the same thread. The conventional lock mechanisms have used by most software developer crossing the software industry. The lock described in this invention may or may not be a conventional one. The non-conventional lock mechanisms created in this invention can be acquired by one thread and may be released by same thread or by another thread. Therefore, it is non-conventional lock serving threads on the computing system.

FIG. 1 illustrates an example of a web-console scheme in a simple computing environment that includes a console host 1, a server 3, and a communication network 12. The console host 1 further includes a web-console 9 (a browser). The server 3 includes a native web-console 9, a web server software 7, and a console support software 6, where the console support software 6 further includes web server interface 5 and other service modules 8. It should be noted that the same reference indicators will be used throughout the drawings and the following description to refer to the same or like items.

The console host 1, from which a user is able to perform system tasks or operations for the server 3 through the web-console (browser) 8. The console host 1 can be any computing system on the network 2 such as a server, a desktop PC, a laptop PC, a hand held PDA, or a cell phone. The web browser 9 may be commercially available software from any vendor or a proprietary software. The web browser 9 is able to handle web protocol such as HTTP. The console host 1 may also include other software modules 13 that may be implemented with any suitable programming languages such as C, C++, Java, XML, et cetera. Other software modules 13 are used to communicate between the server 3 and the console host 1 using IP, non-IP or any suitable protocols for receiving and/or sending data between the console host 1 and the server 3.

The server 3 could be a web server computer or any kind of computing system configured with web server software that includes web server software 7 and console supporting software 5. The console supporting software 6 includes web server interface 5 and other services software modules 8, where the other services software 8 is operated natively on the server 3. The web server software 4 may be a commercially available software or proprietary software, which is able to accept and handle the web protocol such as HTTP. A native web-console (browser) 9 enables a user to access and operate the server computer 3 locally.

Net 2 represents a network infrastructure such as Internet, intranet, and (LAN). The net 2 includes all kind of related network equipment and media such as switches/routers, and different kind of connecting cables and wireless communication media.

FIG. 2 shows an example of a simplified block diagram for an embodiment of the CCDSVM. The CCDSVM system includes console hosts 1, a control management station ("control system") 2, system units 3, networks of net1 11 and net2 12, and client systems 10. The console hosts 1 could be any computing system on the network such as a server, a desktop PC, a laptop PC, a hand held PDA, or a cell phone. A web browser 9 on the console host 1 can be used to access and operate the entire CCDSVM. The web browser 9 may be commercially available software from any vendor or proprietary software company. The web browser 9 is able to handle web protocol such as HTTP. A difference between a web-console 9 and a web browser is that the web-console 9 allows a user accessing system information and performing system operation over computing system such as in the CCDSVM environment.

The console host 1 may also include other software modules 13, which may be implemented with any suitable programming languages such as C, C++, Java, XML etc. These software modules 13 may be used to facilitate communications between the control system 2 and the console hosts 1 using IP, non-IP or any suitable protocols for receiving or sending data between the console host 1 and the control system 2. To support a non-web-based networked console, the software configured for the web console 9 shall be capable of handling protocols other than web protocols such as deploying HTTP for communicating with the console supporting software 6 on the control system.

The control system 2 could be any computing system on the network such as a server, a desktop PC, a laptop PC, or others. The control system 2 includes web server software 7 and console supporting software 6. The console supporting software 6 includes web server interface software modules 5 and control management software modules 4. It should be noted that the console supporting software 6 may includes others service software modules. It may also have a native web browser used as a native web-console 9. The web server software 7 discussed earlier could be commercially available software from a major vendor or other proprietary software that is able to accept and handle the web protocol such as HTTP. The web server software 7 sends data to and receives data from the web-console 9 of the console hosts 1.

The console supporting software 6 can be implemented with any suitable languages such as C, C++, Java, XML, etc. or even implemented by using a combination of different languages as long as it provides the features and functionality described in this invention. That means it is language independent. In addition, the communication protocol used between the console support software 6 and the service software modules 8 of the system units 3 could be any suitable protocol such IP based, or non-IP based or other protocols. The console support software (6) communicates and manages one or more system units 3 and collects resource information on the control system 2 and/or one or more system units 3.

There may be several fixed threads being created based on the control management software modules 4, and each fixed threads may create one or multiple child threads for perform one or more multiple tasks. There are may be various number of threads that are created based on the web server interface software modules 5 for supporting each of tasks submitted by a user via operation menu displayed in the web-console 9. All of these threads may be communicated with each other through inter-process communication and are simply referred as the thread of the console supporting software 6. However, to simplify the discussion, they may be just referred as the console supporting software 6 without mentioning the thread at all.

If there is a need to support a less effective non-web-based networked console, there is no need for the web server software 7 and web server interfacing software module 5 being employed. Instead, an additional network software module is required that could be implemented with any suitable programming language and any suitable communication protocol other than web protocol (HTTP). This network software module can communicate with networked console software on the console host 1 across a communication network and can communicate with the rest of the console supporting software 6 via inter-process communication mechanism.

The system unit 3 could be any computing system on the network such as a server, a desktop PC, a laptop PC, a hand held PDA, a cell phone, and any operational system. The server could be a video server, a web server, a storage block data server (SAN unit), a video monitoring device, and so forth without limits. The system unit 3 contains service software modules 8 that are capable of communicating with the outside world. For example, the service modules 8 is used to communicate with the control management software 4 of the control system 2 for carrying out the tasks distributed from the control system 2, or to communicate with the clients 10 of the CCDSVM for delivering services to them, or to communicate with another system unit 3 for transferring the data. The service software modules 8 could be implemented with any suitable programming languages such as C, C++, Java, or others. It should be noted that the communication protocol could be any suitable protocol such as IP (Internet Protocol) base or other non-IP based protocol.

The net1 11 represents any kind of communication links between the control system 2 and the web-console 9 or the client hosts 10. The net1 11 could be an infrastructure of internet, intranet, LAN or others that comprises connection media such as cables of Ethernet, optical Fiber, and/or other, wireless media, bus, and includes communication equipment such as switches, routers, and/or adapters.

The net2 12 also represents a communication infrastructure comprising communication media and equipment that are similar to the net1 11 has, except for providing communication between the control system 2 and the system units 3 or the web-consoles 9 across the infrastructure of internet, intranet, LAN, WAN, or other.

The client systems 10 are not part of the CCDSVM but they may requests services from the CCDSVM as shown in FIG. 2 via web browser.

FIG. 3 illustrates a simplified data flow between the web-console 9 on the console host 1 of FIG. 2 and the console supporting software 6 on the control system 2 of FIG. 2. Data travel from the web-console 9 to the console supporting software 6 includes two steps. First, the data goes from the web-console 9 to the web server software 7 of FIG. 2 via the net 11 or 12 of FIG. 2. Second, the console supporting software 6 gets the data from the web server software 7 of FIG. 2 via inter-process communication. To simplify the discussion of this invention, this data traveling path will simply refer to as the console supporting software 6 getting the data from the web-console 9 or refer to as the data being sent from the web-console 9 to the console supporting software 6.

Data traveling from the console supporting software 6 to the web-console 9 includes two reverse steps. First, the web server software 7 gets the data from the console supporting software 6 via inter-process communication. Second, the web server software 7 sends data to the web-console 9 via the net 11 or 12. To simplify the rest of discussion, this reverse data traveling will refer to as data being sent from the console supporting software 6 to the web-console 9 or refer to as the web-console 9 gets data from the console supporting software 6. In addition, the terms of data, information, and information on a web page will be used interchangeably herein.

Figure 4:
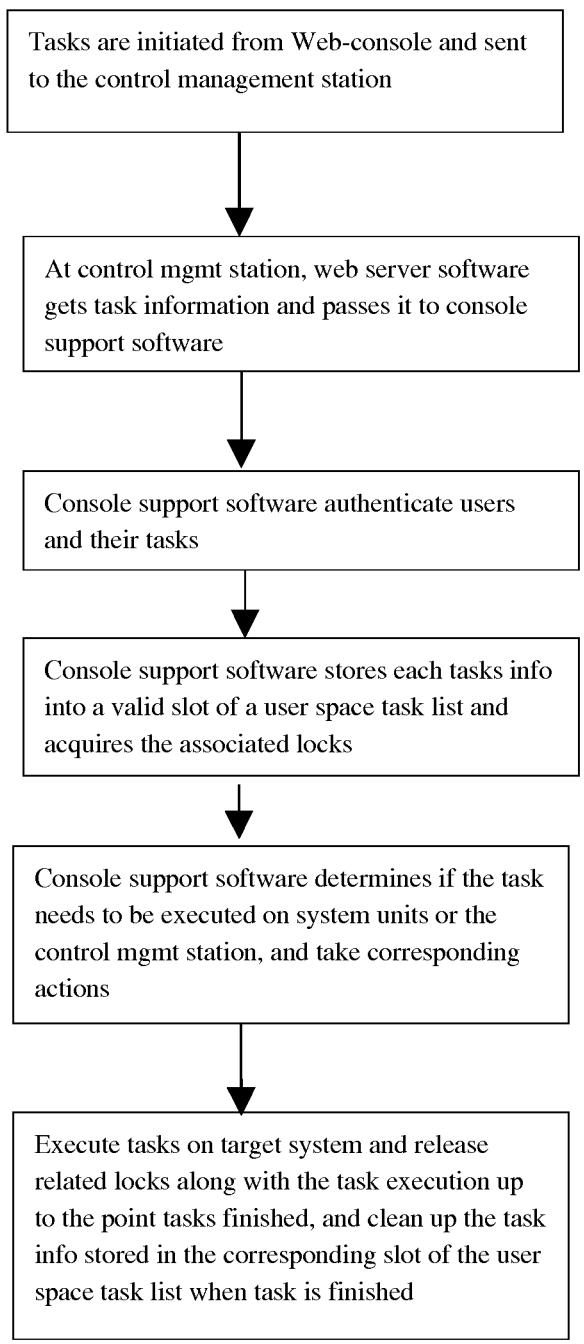
FIG. 4 illustrates an example of operation processing flow for a task in the CCDSVM environment.

FIG. 4 shows the basic tasks and operation processing flow chart, which initiated from the web-console 9.

FIG. 5 shows one embodiment of a user space task list. Each slot on the user space task list can be used to one task information relating to a task issued from the web-console 9. The stored task information in the slot will be cleared upon the task execution is finished.

Figure 6:
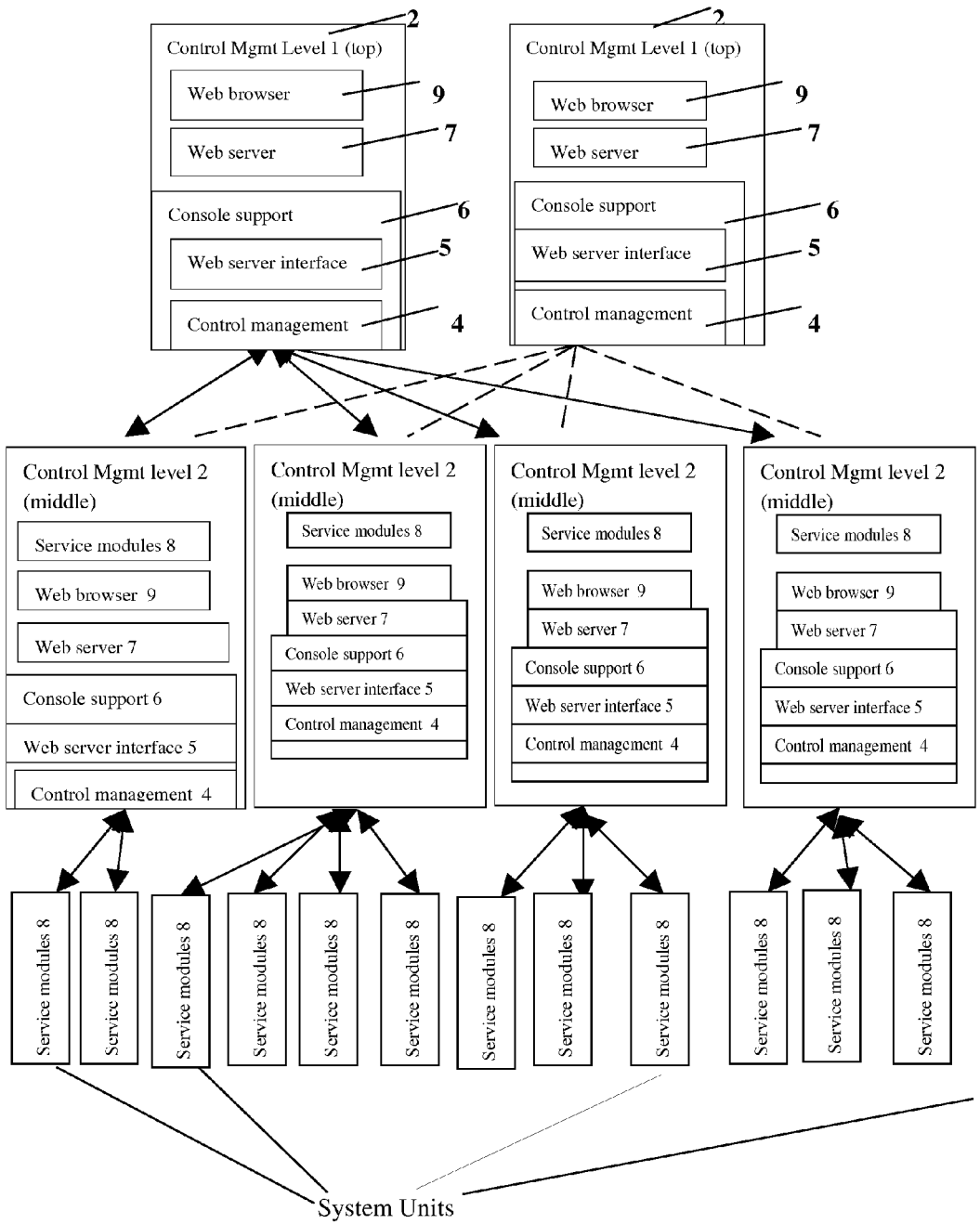
FIG. 6 illustrates a layered CCDSVM structure.

FIG. 6 illustrates another embodiment of a layered CCDSVM environment, which provides a flexible scalability mechanism to efficiently support thousands of heterogeneous system units 3. With this structure, a control system 2 at middle layer 2 becomes a system unit 3 and is controlled by a control system 2 at up layer 1.

Figure 7:
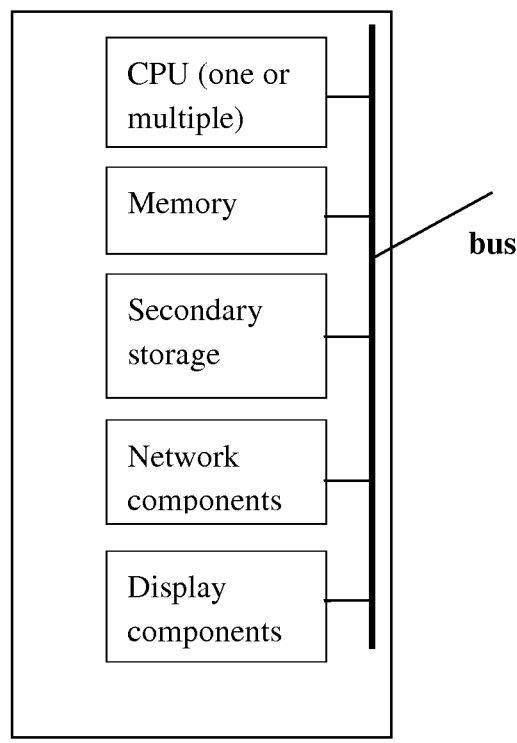
FIG. 7 illustrates typical hardware components for a computing device such as for a control management system, system units, and console system of present invention, where each computing device consists one or more CPU, memory, secondary storage such as disks or memory sticks, the network interface cards, and display components such as monitor or others. These components are connected through buses.

FIG. 7 illustrates a embodiment of typical hardware components for a computing system such as for the control management system 2, system units 3, and console hosts 1. The typical hardware consists of one or more CPU, memory, secondary storage such as disk drives and/or memory sticks, the network interface cards, and display components such as monitor or others. These components are connected internally through buses.

The detailed explanation of FIG. 2 will demonstrate how multiple concurrent tasks can be initiated from a web-console 9 and can be executed either on any one of the system units 3 or on the control system 2 according to this invention.

In one example, a user A at a web-console 9 receives an authentication from the console supporting software 6. In one embodiment, a successfully login on the control system 2 is considered an authentication because it authorizes the user A to access the CCDSVM. Thereafter, the user A can obtain all necessary information about the system units 3 and the control system 2 received from the console supporting software 6. When the user A initiates a task for a selected target computing system, which is either a system unit 3 or the control system 2, the task information is transmitted via the net 11 or 12 from the web-console 9 to the console support software 6 on the control system 2.

A thread is created based on the console support software, 6 where the thread will serve and carry out this task in background. The created thread acquires a lock and stores the task information into a valid entry of a user space task list shown in FIG. 5. This is one of efforts to ensure that the multiple tasks can be initiated simultaneously and concurrently within the same web-console 9 of FIG. 2 without delaying, effecting or blocking each other in the web-console 9 and free from racing each other.

In addition, multiple web-consoles 9 for multiple concurrent users anywhere on the net 11 or 12 also can be supported. The obtained locks for this task will be properly released one at a time along with the task execution up to a point when the task is finally finished. Therefore, each task could be executed without time delay. Also, the stored task information will be removed upon the execution of the task is finished.

If total tasks initiated from the web-console 9 have succeeded the maximum tasks allowed by the console supporting software 6, the initiated task is failed. The locks will be released by the corresponding thread and the user A on the web-console 9 will be notified correspondingly via net.

If an existing task is in a stage of changing a resource object on a target system and if a newly created task will make change on the same resource object on that target system, the newly initiated task may fail or may have to wait until the previous task is finished. Further, if a task is failed, the locks associated with the task will be release by the thread and the user A on the web-console 9 will be notified across the network of 11 or 12 by the console support software 6.

The credential of executing a specific task on a specific target computing system submitted by the user A is checked, where an ordinary users' access & operation permissions and credentials are setup by administrator with supervisor or special privileges. If the user A is not permitted to perform any task on such target computing system or is not permitted to perform such task on any one of the computing systems in the CCDSVM, the task execution will fail and the user A will be notified. Otherwise, the task will be carried out by the corresponding thread on the target computing system that is either a control system 2 or a system unit 3. If there is a need, the console supporting software 6 will send the results or data back to the web-console 9. When the task is failed nor succeeded, the threads of the console supporting software 6 will release the locks acquired for this task.

If the task needs to be executed on the control system 2, the thread created based on the console supporting software 6 will carry out this task. The threads of the console support software 6 also need to determine if they need to create another thread to execute this task. If there is a need, another thread will be created to execute this task. Once the task is finished, the corresponding locks will be released by the console supporting software 6.

If a task needs to be executed on a system unit 3, the console supporting software 6 will transmit the task information via the net2 12 to the service software module 8 of the target system unit 3. The thread based on the service software module 8 of the target system unit 3 will carry out this task. The service software module 8 on the target system unit 3 needs to determine if an additional thread needs to be created in order to execute such task. If there is a need, an additional thread is created to execute this task. Once the task is finished on the target system unit 3, the corresponding status of the task execution is transmitted back to the console supporting software 6 of the control system 2. Upon receiving the task finished status, the locks associated with the thread of the console support software 6 for that task are released.

The Task Issued from Web-Console

The multiple concurrent tasks issued from a web-console 9 by a user could be any of the followings:

a) Move or transmit data such as a multiple gigabytes of file or other data in any form from any point or any computing system to another point or another computing system within the CCDSVM.

b) Configure, partition and assign entire storage system (raid/disk) within the CCDSVM.

c) Setup authentication for a specific user from a web-console on a specific console host with certain privilege for the entire CCDSVM or for a specific computing system, which could be any one of the system units 3 or a control system 2. Setting up the steps of authentication process for any specific services on one or more specific system units 3.

d) Monitor and display activities and status for networks, storages, CPUs, processes and threads in the CCDSVM.

e) Create file system, file and directory structures, and support all other related data file operations on either the control management system 2 or the system units 3.

f) And all other type of tasks and operations that might be run in other operating system (OS) environment.

The capability of providing user with the multiple concurrent simultaneous operations and tasks on the web console 9 has indicated that this invention has created a web-based user work environment on top of an existing operating system of a single computing system or multiple computing systems. Further, this is a consistent working environment for a computing system since it allows a user to access exact the same working environment through the web-console 9, which could be a web browser located either on the computing system or located on other remote systems.

User Login

The user-login mechanism is also supported by the console supporting software 6. The web-console 9 obtains a login web page from the console supporting software 6 via the network of 11 & 12. Once the user provides an account name and a password via the login page displayed in the web-console 9, the authentication information is sent to the console supporting software 6 for validation. Upon successful validating the user account and password information, the console support software 6 sends all necessary information such as IP address to the web-console 9, where the information also includes the information of the control system 2 and system units 3.

The Maximum Tasks

The maximum multiple concurrent simultaneous tasks that can be initiated from the web-consoles 9 are determined by the console support software modules 6, and they are also determined based on the needs and the capacity of the control system 2.

The Credential Checking

The credential of a user includes the permission to access all or partial computing systems or a single computing system within the CCDSVM. The credential further includes the permission to run all tasks or partial tasks that are listed in the previous section of "The Task Issued From Web-Console". It also includes the permission of accessing a specific size of storage volumes. For example, a user B may be granted a permission to run tasks on computing systems X, Y, and Z. Another user C may be granted a permission to run tasks on the entire computing systems in the CCDSVM environment. The user C might be allowed to get system status on the computing systems X, Y, and Z only while the user B may be allowed to run all tasks on the computing systems X, Y, and Z. Each computing system mentioned here could be a control system 2 or any of system units 3. This basically represents a two-level authentication policy and checking. The first level is the security imposed on the control system 2 and the second level is the security imposed on the system units (3 of FIG. 2).

The Web-Server Interface Software Modules

The web-server interfacing software module 5 is responsible to get information from or send information to the web server software 7. It also interacts with the control management modules 4 via inter-process communication and communicates with service module 8 of the system unit 3 via the net2 12.

The Control Management Software Modules

The control management modules 4 on the control system 2 are responsible for communicating with the system units 3 for sending data to or receiving data from the system units via the net2 12. It also provides information of the system units 3 to the web interface software modules 5 of the control system 2 via an inter-process communication mechanism.

The Layered CCDSVM Structure

To be more efficiently support multiple concurrent tasks over a larger number of the system units 3, the CCDSVM can be organized into a multi-layered structure as illustrated in FIG. 6. With this layered structure, the CCDSVM can be sub-divided into different groups. For example, each one of level-2 control systems could function both as the control system 2 for controlling the system units 3 below it and could function as a system unit 3 that is controlled by the level-1 control system 2. Therefore, the level-2 control management station must be configured with all related software modules for both the control management station 2 and the system unit 3.

What is claimed is:

1. A multi-layered web system controlling centralized web based access, the web system comprising:
    at least a first level server;
    a plurality of second level servers being centrally controlled by the first level server across a communication network;
    a plurality of third level servers being configured into a plurality of groups, wherein each of the groups comprises one or more of the third level servers, and is associated with and centrally controlled by one of the second level servers across the communication network; and
    a web multitask support mechanism for supporting operations of the web system; and
    wherein the first level server is configured to:
        send via a web page information of the second level servers to an access device, allowing a user via the information being displayed on the access device to selectively submit a task for access to one or more of the second level servers; and
        activate the web multitask support mechanism to process the task received from the access device in the background, the processing of the task comprising to distribute the task to the one or more of the second level servers for carrying out the task without causing to interfere the display of the information on the access device during a regular network traffic; and
    wherein each of the second level servers is configured to:
        send via a web page information of one or more third level servers in an associated one of the groups to an access device, allowing a user via the information being displayed on the access device to selectively submit a task for access to one or more of the third level servers in the associated one of the groups; and
        activate the web multitask support mechanism to process the task received from the access device; in the background, the processing of the task comprising to distribute the task to the one or more of the third level servers for carrying out the task without causing to block the display of the information on the access device during a regular network traffic.

2. The web system of claim 1, wherein said communication network is one of the Internet, a corporate Intranet, wide area network ("WAN") or local area network ("LAN"), and comprises wired and wireless communication links.

3. The web system of claim 1, wherein each of the access devices is one of a wireless personal communication device, a laptop computer, a desktop computer or a server, and is operable to execute a web browser to display said information via said web page received from a corresponding server at a designated level in the web system.

4. The web system of claim 1, wherein said first level server obtains via the each of the second level servers information of one or more third level servers in the associated one of the groups, and displays via a web page the obtained information on the access device corresponding to the first level server.

5. The web system of claim 1, wherein each of the users is assigned permissions for access to one or more specific servers at one or more levels in the web system, is allowed via a corresponding access device to log in the first level or one of the second level servers only once to further submit corresponding said task.

6. The web system of claim 1, wherein each of the second level servers receives, executes and responds to a task distributed from the first level server, obtains information including internet protocol ("IP") address from each of the one or more third level servers in the associated one of the groups.

7. The web system of claim 1, wherein said activation of the web multitask support mechanism further comprises:
    storing information of a task before the processing of the task;
    providing an immediate response to an access device from which the task is received regardless of whether the processing of the task is completed nor not; and
    cleaning up the stored information of the task in response to the completion of the processing of the task;
    wherein the web multitask support mechanism invokes at least a lock to protect the processing of the task.

8. The web system of the claim 1, wherein the first level server or each of the second level servers is further operable to display via a web page self information on an corresponding access device, allowing user of the corresponding access device via the displayed information to perform operations to the first level server or to the each of the second level servers.

9. The web system of the claim 1, wherein said processing of a task in the background comprises:
    allowing at least a second task to be submitted via corresponding said information displayed on one of the access devices immediately following a submission of a first task without waiting for completion of the processing of the first task.

10. The web system of claim 4, further comprising:
    allowing a user via the information displayed on the access device corresponding to the first level server to submit a task for access to one or more of the third level servers in the associate one of the groups.

11. The web system of claim 10, wherein the first level server further executes the task received from the access devices in background, comprising to distribute the task to the one or more of the third level servers for carrying out the task without causing to interfere the display of the information on the access device during a regular network traffic.

12. The web system of claim 11, wherein each of the third level servers in the associated one of the groups further receives, executes, and responses to the task distributed from the first level server.

13. The web system of claim 9, wherein one of the first and second tasks to be performed further comprises:
    access to an application service of a video, web, database, or storage service provided by one of the third level servers in one of the groups of the web system.

14. The web system of claim 9, wherein one of the first and second tasks to be performed further comprises:
    creating file system for storage device residing in one of the servers at a designated level of the web system or transferring file between two of permitted servers in the web system.

15. The web system of the claim 9, wherein one of the first and second tasks to be performed further comprises:
    monitoring status of networks, storages, hardware processors, or processes and threads of one of the servers at a designated level of the web system.

16. The web system of the claim 9, wherein one of the first and second tasks to be performed further comprises:
    configuring a storage controller, or partitioning a storage device in respect to the storage controller residing in one of the servers at a designated level of the web system.

17. The web system of claim 13, wherein said access to the storage service further comprises:
   allocating a storage space of predetermined capacity, residing the one of the third level servers, to an access device, allowing a user via an access device to create a folder in the storage space.

18. The web system of claim 17, wherein said access to the storage service further comprises:
   allowing the user via the access device to the folder for storing a file therein or retrieving a file therefrom.

19. The web system of claim 13, wherein each of the third level servers delivers the application service directly to an access device from which the task for access to the application service is received.

20. A second level server in a multi-layered web system controlling centralized web based access, the second level server comprising:
   at least a hardware processor;
   at least a service module comprising program instructions to be executed for receiving, executing, and responding to at least a task distributed from a first level server in the web system across a communication network; and
   at least a server module comprising program instructions to be executed for configuring the second level server to centrally control a plurality of third level servers in the web system across the communication network;
   wherein the second level server is configured to:
      send via a web page information of the third level servers to an access device, allowing a user via the information being displayed on the access device to selectively submit a task for access to one or more of the third level servers; and
      activate a web multitask support mechanism to process the task received from the access device in the background, the processing of the task comprising to distribute the task to the one or more of the third level servers for carrying out the task without causing to block the display of the information on the access device during a regular network traffic.

21. A first level server in a multi-layered web system controlling centralized web access, the first level server comprising:
   at least a hardware processor; and
   at least a server module comprising program instructions to be executed for configuring the first level server to centrally control operations for a plurality of second level servers across a communication network,
      wherein each of the second level servers centrally controls operations for an associated group of one or more third level servers;
   wherein the first level server is configured to:
      send via a web page information of the second level servers to an access device, allowing a user via the information being displayed on the access device to selectively submit a task for access to one or more of the second level servers; and
      activate a web multitask support mechanism to process the task received from the access device in the background, the processing of the task comprising to distribute the task to the one or more of the second level servers for carrying out the task without causing to block the display of said information on the access device during a regular network traffic.

22. The first level server of claim 21, wherein said first level server via each of the second level servers obtains information of the associated group and displays via a web page the obtained information on the access device, allowing the user access to the one or more third level servers in the associated group.

* * * * *